United States Patent
Van Roon et al.

(10) Patent No.: US 11,050,113 B2
(45) Date of Patent: Jun. 29, 2021

(54) BATTERY HOLDER

(71) Applicant: Flextronics AP, LLC, San Jose, CA (US)

(72) Inventors: Darren Van Roon, Bowmanville (CA); Gary Warren, Aurora (CA); Steven Steane, Courtice (CA)

(73) Assignee: FLEXTRONICS AP, LLC., San Jose, CA (US)

(*) Notice: Subject to any disclaimer, the term of this patent is extended or adjusted under 35 U.S.C. 154(b) by 188 days.

(21) Appl. No.: 15/681,004

(22) Filed: Aug. 18, 2017

(65) Prior Publication Data
US 2018/0053922 A1 Feb. 22, 2018

Related U.S. Application Data

(60) Provisional application No. 62/377,319, filed on Aug. 19, 2016.

(51) Int. Cl.
*H01M 2/10* (2006.01)
*H01M 50/24* (2021.01)
(Continued)

(52) U.S. Cl.
CPC ........... *H01M 50/24* (2021.01); *H01M 50/20* (2021.01); *H01M 50/213* (2021.01);
(Continued)

(58) Field of Classification Search
CPC ........... H01M 2/1077; H01M 2220/20; H01M 2/1094; H01M 2/1083; H01M 2/0237;
(Continued)

(56) References Cited

U.S. PATENT DOCUMENTS 4,885,219 A * 12/1989 Miller ................. H01M 2/1055
429/99
5,962,159 A 10/1999 Satou et al.
(Continued)

FOREIGN PATENT DOCUMENTS

EP 2500961 A1 9/2012
EP 2787559 A1 10/2014
(Continued)

OTHER PUBLICATIONS

English language machine translation of Yoshida et al. (JP S49-34314 U), (Year: 1974).*
(Continued)

*Primary Examiner* — Jonathan G Jelsma
*Assistant Examiner* — Omar M Kekia
(74) *Attorney, Agent, or Firm* — Volpe Koenig

(57) ABSTRACT

Described herein is a system and method for securing a battery in an enclosure with some degree of flexibility between the components to adjust for variations in size of the components. A battery holder assembly comprises a first housing component, a second housing component, and a battery. The first component includes a battery receptacle, comprising a plurality of flexible arms to surround a battery. The second component comprises a plurality of crush ribs having a solid support, that will wedge in-between the second housing component wall and the flexible arms, and that have a specially designed protrusion that is "crushable." The flexible arms, which are in contact with the battery are wide enough to spread out the force, so as not to damage the battery, while the crush ribs will dig only into the plastic to arrest the battery's vibration while compensating for the remaining tolerance or variation between components.

20 Claims, 14 Drawing Sheets

(51) Int. Cl.
*H01M 50/20* (2021.01)
*H01M 50/213* (2021.01)
*H01M 50/267* (2021.01)

(52) U.S. Cl.
CPC ...... *H01M 50/267* (2021.01); *H01M 2220/20* (2013.01); *Y02E 60/10* (2013.01)

(58) Field of Classification Search
CPC ........ H01M 2/10; H01M 2/1016; H01M 2/04; H01M 2/1072; H01M 2/1033; H01M 2/105; H01M 50/267; H01M 50/24; H01M 50/20; H01M 50/213; Y02E 60/10
USPC ....................................................... 429/186
See application file for complete search history.

(56) References Cited

U.S. PATENT DOCUMENTS

| | | | |
|---|---|---|---|
| 9,331,315 | B1 | 5/2016 | Goulden et al. |
| 2015/0037649 | A1* | 2/2015 | Wyatt ................ H01M 10/625 |
| | | | 429/120 |

FOREIGN PATENT DOCUMENTS

| | | |
|---|---|---|
| JP | S49-34314 | 6/1949 |
| JP | 2008258110 A | 10/2008 |
| JP | 2009131090 A | 6/2009 |
| JP | 2013105637 A | 5/2013 |

OTHER PUBLICATIONS

International Search Report for EP counterpart Application No. PCT/US2017/047838 dated Oct. 18, 2017.

* cited by examiner

BATTERY HOLDER

CROSS REFERENCE TO RELATED APPLICATION

This application claims the benefit of U.S. provisional application No. 62/377,319 filed on Aug. 19, 2016, which is incorporated by reference as if fully set forth.

FIELD OF INVENTION

This invention relates to a battery holder assembly for housing a battery securely.

BACKGROUND

To ensure that a battery residing in a battery assembly module does not become dislodged, damaged, or cause damage to other parts of the battery assembly module, the battery must be tightly secured within the battery holder assembly module. In order to achieve such a tight and secure assembly, the battery must not be too big or too small for the space that is designed to house it. If the battery is too big, the components of the battery holder assembly, and the battery itself, can interfere with one another and not allow the battery to make the necessary electrical contacts. On the other hand, if the battery is too small, it may move around within the assembly. This is an especially important consideration for a battery housed in a battery holder assembly module within a device where the battery could potentially get knocked around. An exemplary device includes a vehicle telematics system, wherein the battery could potentially get knocked around, especially in the case of a crash scenario.

During production of batteries, a small amount of variation in size may occur from one battery to the next. Although a small amount of interference between components in a battery holder assembly is tolerable, to ensure a tight and secure fit, the battery cannot be too big or too small as described above. Therefore, a compensation, or tolerance between components of the battery holder assembly is needed to address these variations in battery size.

To achieve this compensation or tolerance, designing a battery holder assembly module that has some flexibility between its components may help to compensate for these variations in battery size. However, the degree of flexibility must also be taken into consideration because components that are too flexible will not allow for the battery assembly module and all of it components to withstand a crash scenario for example, because the flexible components may move around when a large amount of force is applied to it.

Accordingly, a need exists for a battery assembly module comprising components that are flexible enough to allow for compensation of these variations in battery size, but that are not too flexible, and that also have an appropriately low enough degree of interference between the components, so that a battery can be secularly held in place.

SUMMARY

In an aspect, the invention relates to a system and method for securing a battery in a battery holder assembly with some degree of flexibility between the components to adjust for variations in size. The battery holder assembly includes a first housing component and a second housing component that are coupled together to form the assembly. The first housing component includes a battery receptacle, comprising a plurality of flexible arms to surround a battery. The second housing component comprises a plurality of crush ribs having a solid support, that will wedge in-between the second housing component wall and the flexible arms, and that have a specially designed protrusion that is "crushable."

The flexible arms, which are in contact with the battery are wide enough to spread out the force, so as not to damage the battery, while the crush ribs will dig only into the plastic to arrest the battery's vibration while compensating for the remaining tolerance or variation between components.

It is the combination of the crush ribs and the flexible arms that allow for optimal connection to occur between the two housing components of the battery assembly module housing the battery; a connection that is rigid enough to secure the battery in place and a connection that is flexible enough to compensate for variations in battery size and tolerance between components.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Figure 1A:
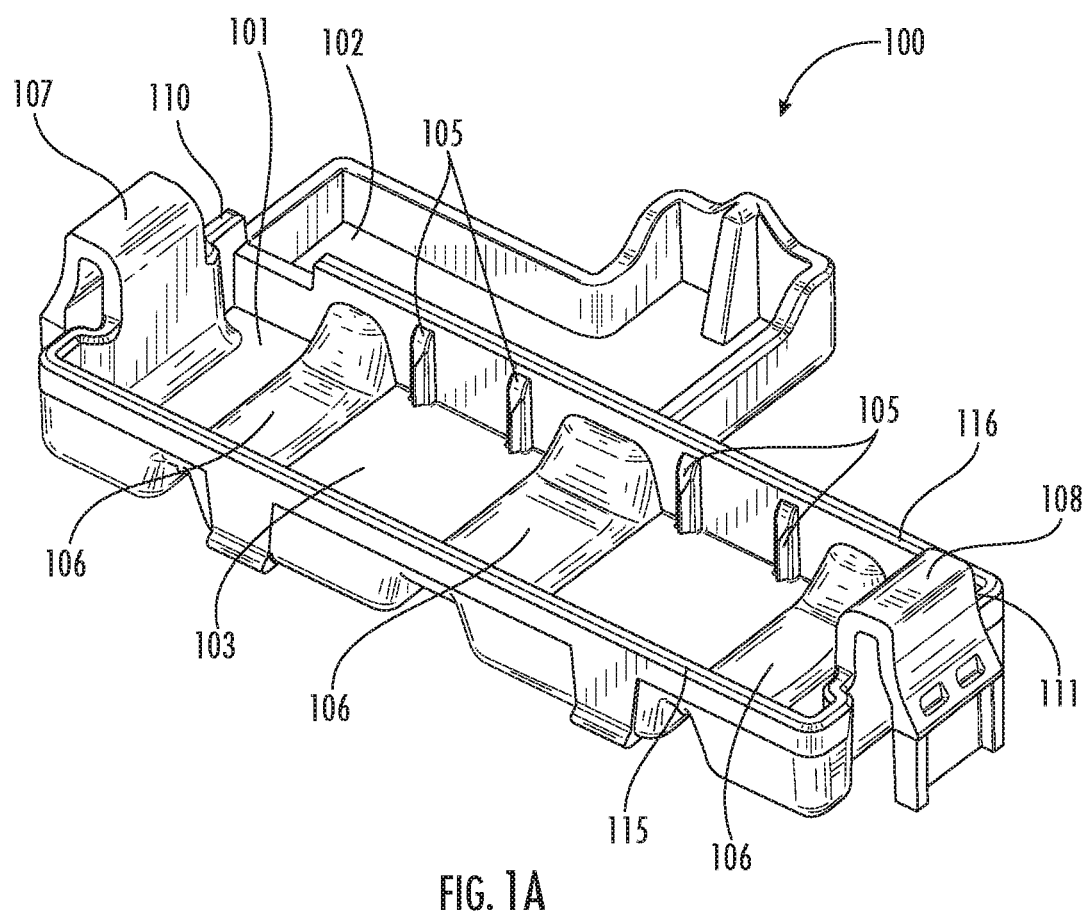
FIG. 1A is a perspective view of the inner surface of a second housing component of a battery holder assembly.
Figure 1B:
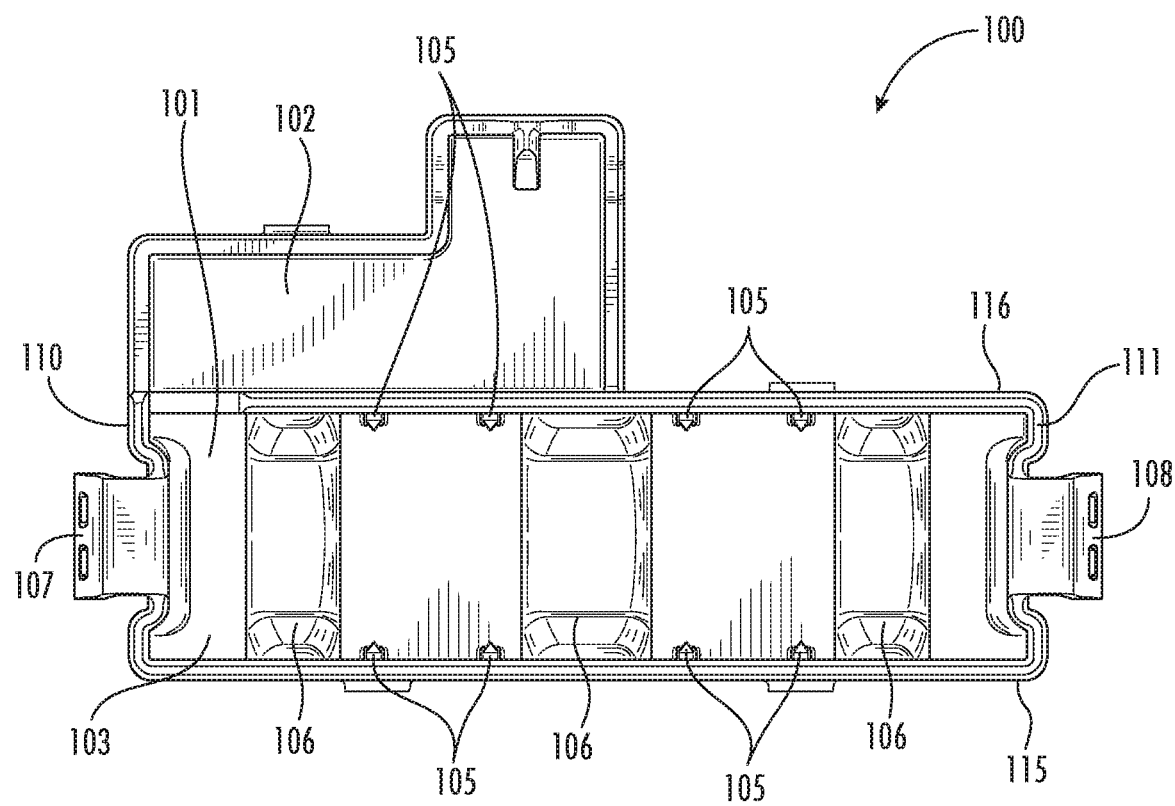
FIG. 1B is a top view of the inner surface of a second housing component of a battery holder assembly

FIG. 1A illustrates a perspective view of the inner surface of an exemplary second housing component 100 comprising a top surface. The inner surface 103 may comprise a first sub-compartment 101 and a second sub-compartment 102, wherein the first sub-compartment 101 includes a first end wall 110, a second end wall 111, a first side wall 115, and a second side wall 116. FIG. 1B illustrates a top view of the second housing component 100 illustrated in FIG. 1A.

In an embodiment, the inner surface 103 further includes a plurality of crush ribs 105 located on the first and second side walls 115, 116. In an embodiment there may be one crush rib 105 located on the inner surface of the first side wall 115 and one crush rib 105 located on the inner surface of the second side wall 116. In another embodiment a plurality of crush ribs 105 are located on the inner surface of the first side wall 115 and a plurality of crush ribs 105 are located on inner surface of the second side wall 116. In an exemplary embodiment, four crush ribs 105 are located on the inner surface of the first side wall 115 and four crush ribs 105 are located on the inner surface of the second side wall 116, as shown if FIGS. 1A and 1B.

In embodiments that include a plurality of crush ribs 105 along the first side wall 115 and the second side wall 116, the crush ribs 105 are positioned at isolated points from one another along the length of the first side wall 115 and the second side wall 116. The distance between the crush ribs 105 on each of the side walls 115, 116 may or may not be equal.

In some embodiments, the number of crush ribs 105 located on the first side wall 115 may be equal to the number of crush ribs 105 located on the second side wall 116. In some embodiments, the number of crush ribs 105 located on the first side wall 115 is not equal to the number of crush ribs 105 located on the second side wall 116. In some embodiments, the crush rib(s) 105 located on the first side wall 115 may be paired and opposite to a crush rib(s) 105 located on the second side wall 116. In some embodiments, the crush rib(s) 105 located on the first side wall 115 is not paired in opposition with a crush rib(s) 105 located the second side wall 116. In an exemplary embodiment, each crush rib 105 located on the first side wall 115 is paired and directly opposite a corresponding crush rib 105 on the second side wall 116.

The crush ribs 105 may be made from one or more flexible materials. In an exemplary embodiment, the crush ribs 105 are made from the same material as the second housing component. Alternatively, the crush ribs 105 may be formed from a different material that the second housing component 100. If the crush ribs 105 are made from the same material as the second housing component 100, the same mould may be used to form both. If the crush ribs 105 and the second housing component 100 are made from different materials, two-step moulding or other techniques commonly known to one of ordinary skill in the art may be used to form the second housing component 100 including crush ribs 105.

The crush ribs 105 may be formed from a plastic material. In an embodiment, the plastic material may be at least softer than the materials used to form the casing of a battery to be inserted into the battery holder assembly 400. An exemplary material used to form the crush ribs 105 is polypropylene.

Figure 1C:
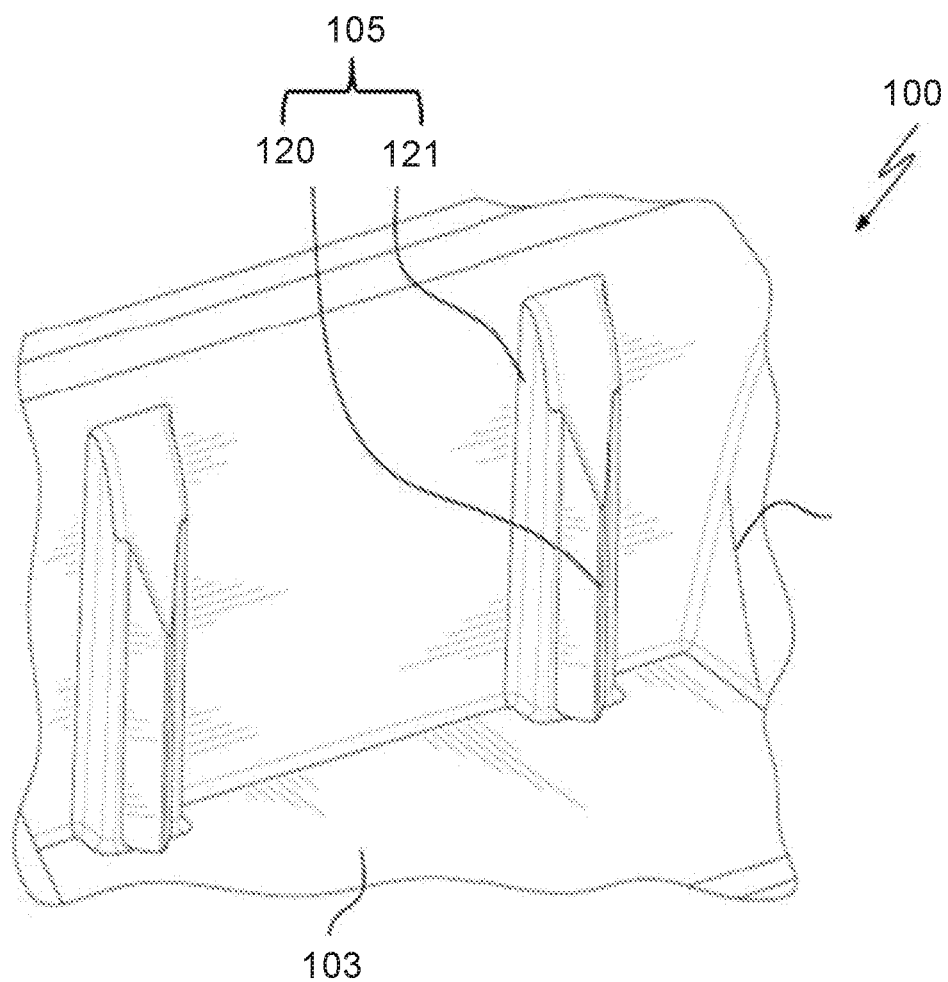
FIG. 1C is a magnified view of a crush rib of the second housing component shown in FIG. 1A.

FIG. 1C illustrates an enlarged view of a crush rib 105 located on the inner surface of a side wall of the second housing component 100. Each crush rib includes a protrusion 120, which projects away from the side wall to which it is attached. In an embodiment, each crush rib may also comprise a ribbing 121 located between the protrusion and the side wall, running at least the length of the protrusion.

In an embodiment, each crush rib 105 may extend from the inner top surface 103 of the second housing component 100, along the inner surface of the side wall 115, 116, and at its distal end, the crush rib 105 may terminate at or before the bottom surface of the side walls. In an exemplary embodiment, illustrated in FIG. 1C, the top face of this distal end is at an angle, which may or may not extend all the way to the bottom surface of the side walls. This angle allows the tip portion of the crush rib 105 to act as a lead-in, allowing it to more easily receive a flexible arm and have it slide along the surface of the protrusion 120.

In an exemplary embodiment, the protrusion 120 of the crush rib 105 is a triangular protrusion 120, as illustrated in FIG. 1C. A crush rib 105 comprising a triangular protrusion 120 may readily deform and be "crushed" when a force is applied to it. This may allow for extra interference to be designed into the battery holder assembly by taking advantage of the flexible material that the crush rib 105 is made of. The extra interference provided by the crush rib 105 is from "crushing" by the force(s) being exerted upon it.

Further, because the crush ribs 105 are attached to a vertical wall, they can take advantage of the nature of the vertical side walls 115, 116 to provide an opposing force back to the crush rib 105. If the vertical side walls 115, 116 are more stiff, this may allow for increased feedback or force to the crush ribs 105, and if the vertical side walls 115, 116 are more flexible, this may allow for them to flex as the "crushing" forces are applied to the crush ribs 105. This latter embodiment may allow for extra interference to be designed into the battery holder assembly with less reliance on the actual "crushing" of the crush ribs 105.

The size of the triangular protrusion 120 may also vary and be adjusted to achieve a desired compression, or "crushing'. Varying the size of the protrusion 120 may allow for a desired interference to be achieved between the crush ribs 105 and the flexible arms 205. Having a particular sized protrusion 120 can also allow for optimum compensation to be achieved between the battery 235 and battery holder assembly 400 components. This may also minimize the effects on compensation as a result of variation in battery size.

With regard to the crush rib's flexible protrusion, it may have a sharp edge, which could potentially dig into the vinyl jacket of a battery and exert a potentially damaging force on the battery. Having the flexible arm between the pointed, flexible protrusion of the crush rib 105 and the vinyl jacket of the battery 235 can prevent this particular damage from occurring to the battery 235.

In an embodiment, the protrusion 120 may comprise any other shaped protrusion that is compressible or crushable when a force is exerted upon it. Non-limiting examples of the shape include a rounded protrusion 120. Assuming all other forces being equivalent, when the protrusion 120 of the crush rib 105 is rounded, the crush rib 105 does not "crush" in as much compared with a crush rib 105 having a triangular protrusion 120. Instead, it is the wall (the first or second side walls 115, 116 of the second housing component 100) which the crush rib 105 is aligned with and connected to that is pressed or flexed outwards. In other words, we are counting more on the flexibility of the plastic of the vertical first and second side walls 115, 116 of the second housing component 100 than on "crushing" of the crush ribs 105. In such an embodiment, the amount of resistive force, or feedback, on the crush rib 105 could be better controlled in part by stiffening of the first and second side walls 115, 116. The size of the protrusion 120 of these alternatively shaped protrusions may vary as well.

In an embodiment, the top surface 103 of the second housing component 100 comprises ribs 106, configured to further secure the battery within a battery receptacle 202. As illustrated in FIG. 1A, each rib 106 extends from the inner surface of the first side wall 115 to the inner surface of the second side wall 116 across the top surface 103 of the second housing component 100. The shape of the ribs 106 may provide additional support for the battery following coupling of the second housing component 100 to the first housing component 200 comprising a battery.

Figure 1D:
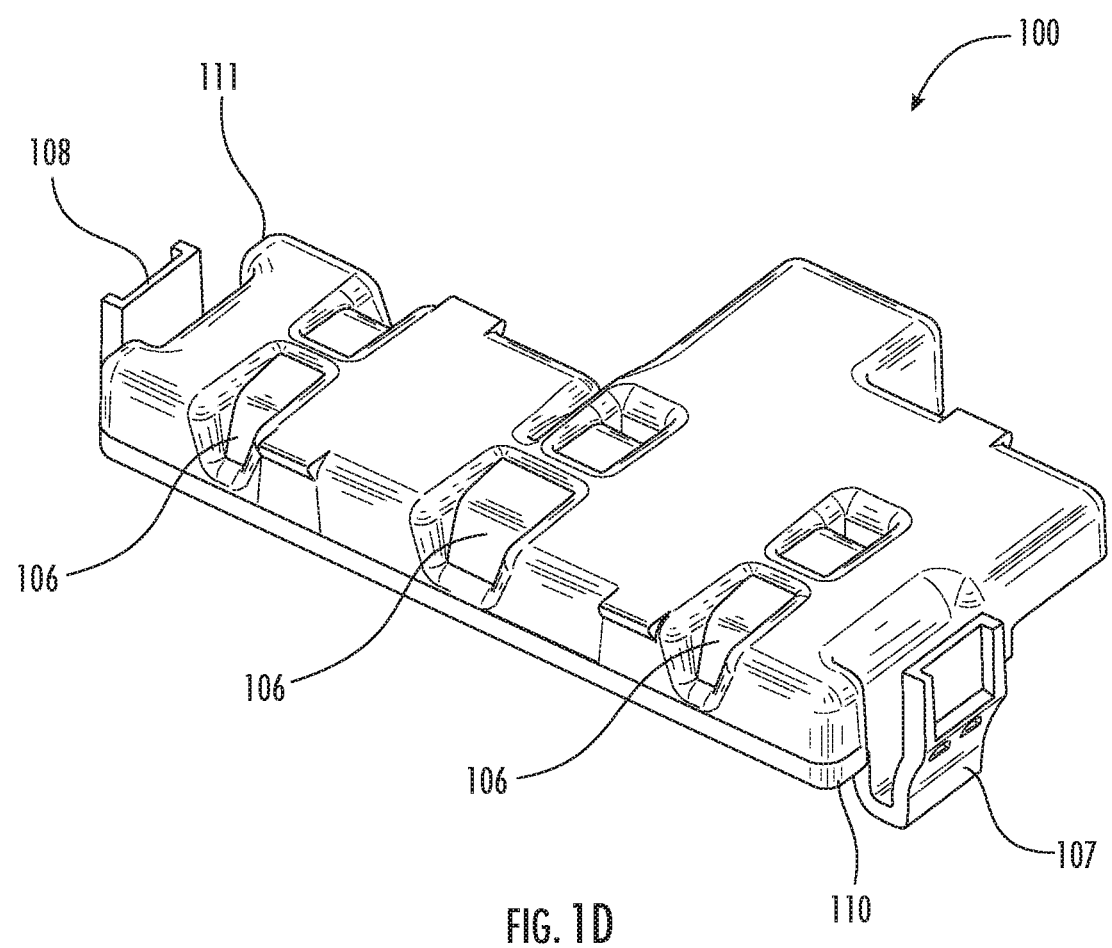

In a non-limiting embodiment, when the battery is a cylindrical battery, the surface of the ribs 106 preferably forms an arc on the inner surface of the second housing component 100. Other non-limiting embodiments of the shape of the ribs 106 are also possible and are determined in part by the shape of the battery residing in the battery receptacle 202. FIG. 1D illustrates the location of the ribbing from the outer surface of the second housing component 100, wherein the ribs 106 are located at the areas of indent along the top surface 103 of the second housing component.

Figure 2A:
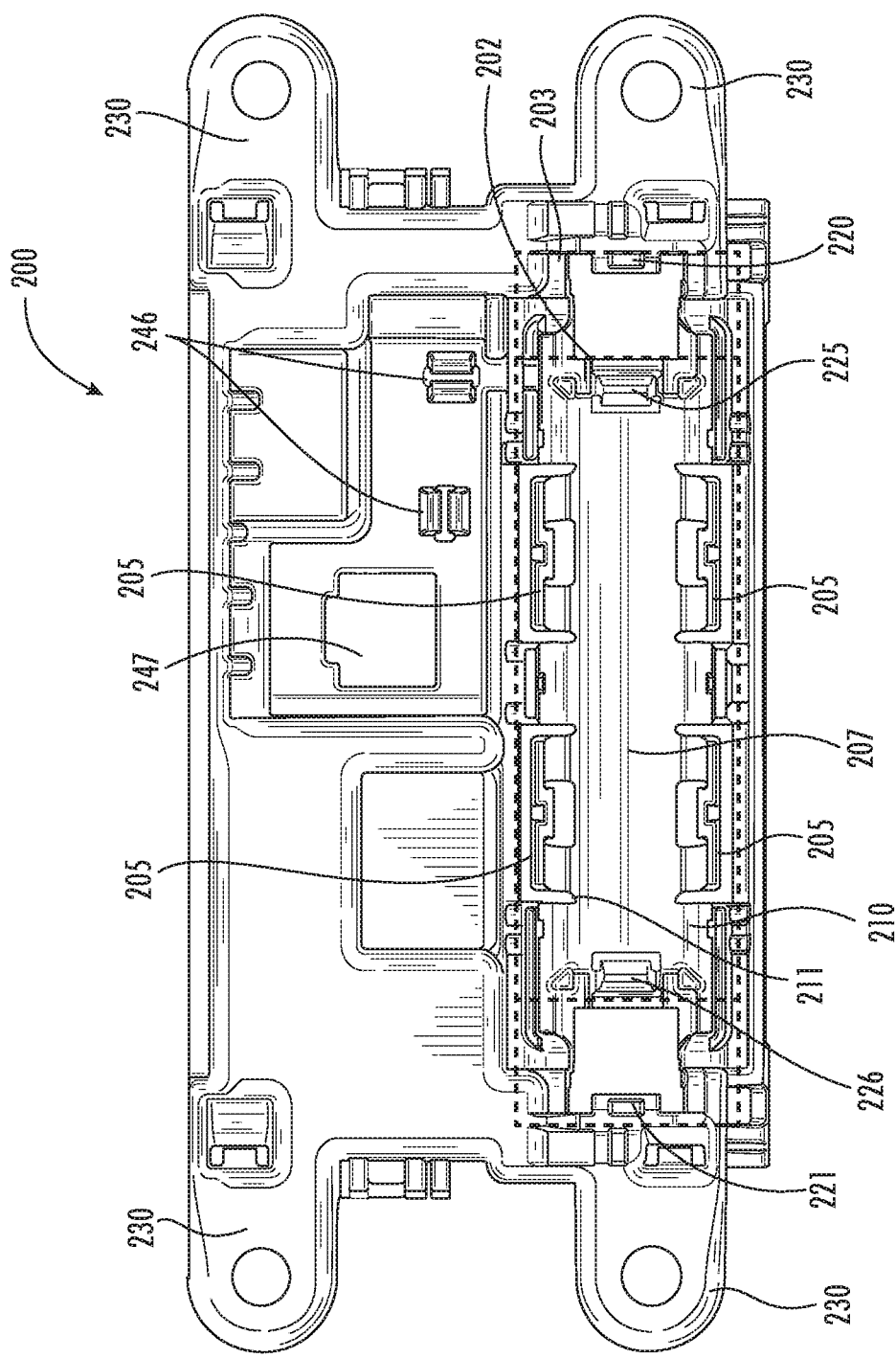
FIG. 2A is a top view of a first housing component of a battery holder assembly.
Figure 2B:
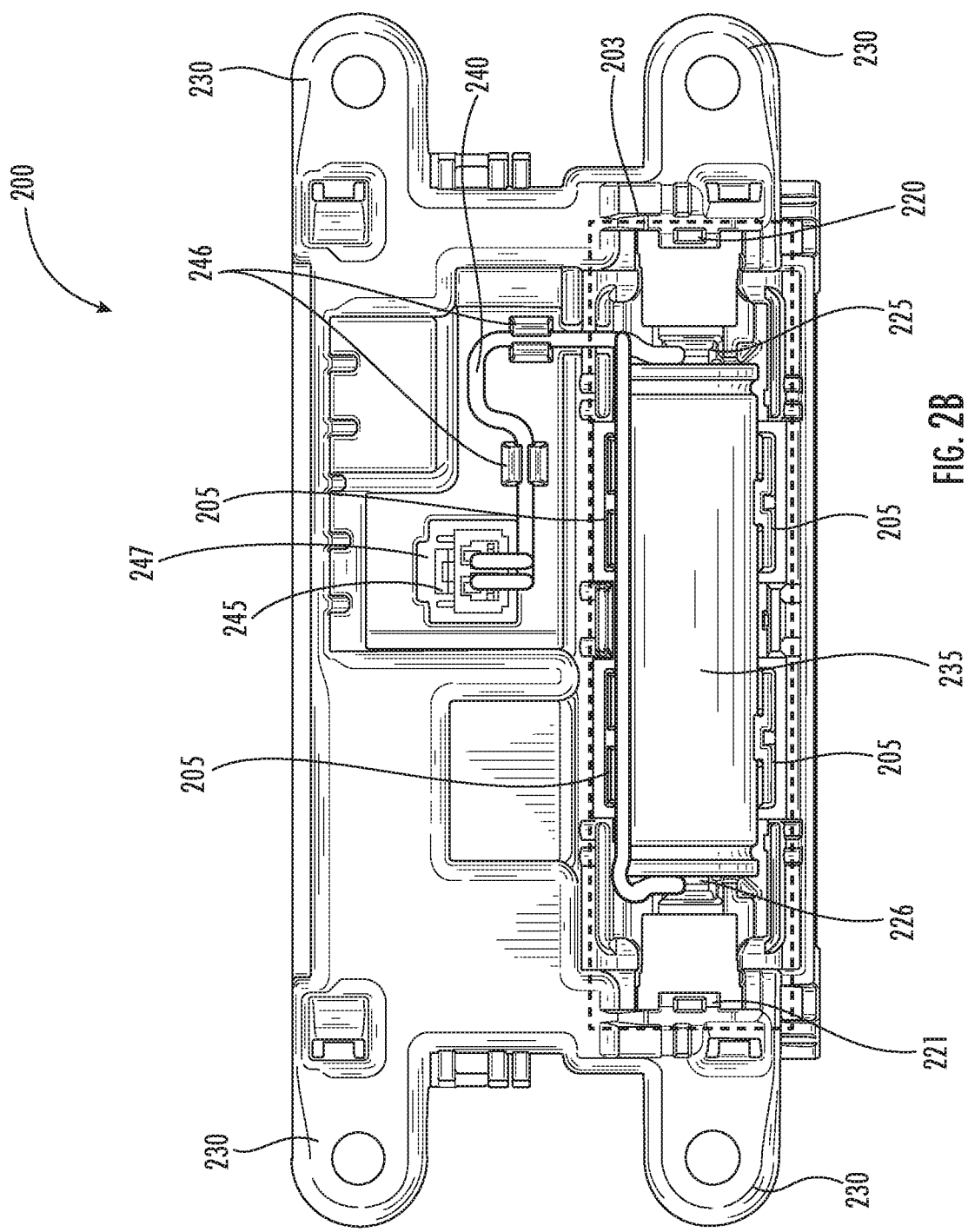
FIG. 2B is a top view of the first housing component as shown in FIG. 2A having a battery positioned within the housing.
Figure 2C:
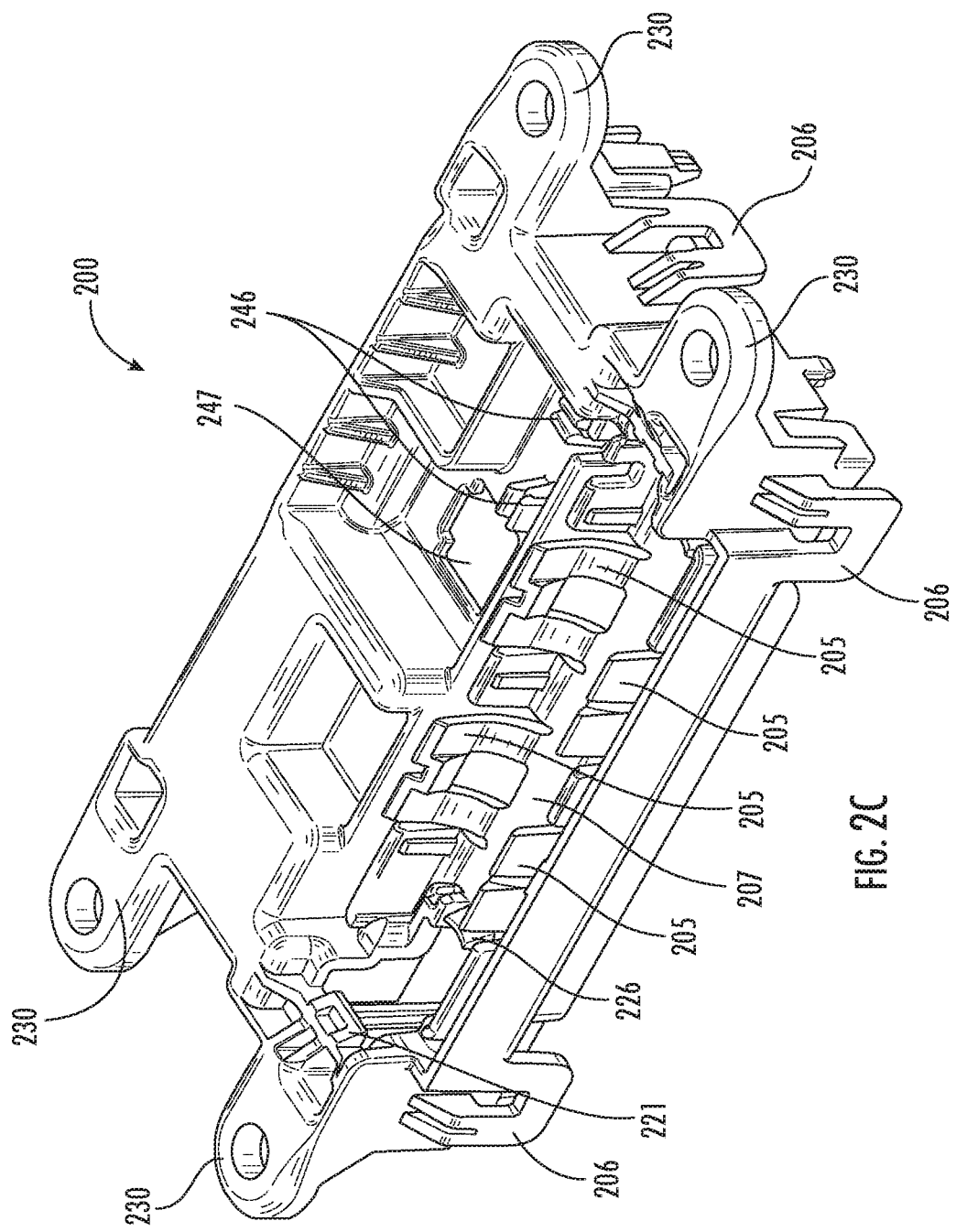
FIG. 2C is a perspective view of the first housing component as shown in FIG. 2A.

In an embodiment, the first sub-compartment 101 of the second housing component 100 may be positioned over a first housing component 200 to cover an opening in the first housing component 200 to a cavity 203 comprising a battery receptacle 202. In another embodiment the second housing component 100 comprises a second sub-compartment 102, which may be used to cover a separate portion of the first housing component, and may include at least a cavity for a battery plug 247 and clips for the battery cables 246 as illustrated in FIGS. 2A and 2B. The inner surface of the second sub-compartment 102 may be separated from the inner surface of the first sub-compartment 101 by at least the second side wall 116 of the first sub-compartment 101 as illustrated in FIGS. 1A and 1B.

The second housing component 100 may further include flexible snaps 107, 108 located at the first and second end walls 110, 111 of the second housing component 100. The flexible snaps 107, 108 are made of flexible materials. Non-limiting examples may include materials such as polypropylene, nylon, and polycarbonate. In an exemplary embodiment, the flexible snaps 107, 108 may be made from the same material as the second housing component 100.

The flexible snaps 107, 108 are configured to engage with hooks 220, 221, which are located on the first housing component 200. The first hook 220 is located on the first housing component 200 at a first end of the cavity and the second hook 221 is located on the first housing component 200 at a second end of the cavity.

In an exemplary embodiment, the first hook 220 and the second hook 221 are located exteriorly to the first flexible snap 107 and the second flexible snap 108, respectively, when the housing components 100, 200 are assembled. As the second housing component is coupled with the first housing component, the first hook 220 exerts an inward force on the first flexible snap 107 towards a first end wall 110 of the second housing component 100, and the second hook 221 exerts an inward force on the second flexible snap 108 towards a second end wall 111 of the second housing component 100. The first and second flexible snaps 107, 108 are flexed in the same direction as the force being applied. When a sufficient amount of force is applied to flexible snaps 107, 108, the second housing component 100 may then be snapped into place within the first housing component 200, wherein the first hook 220 is fully engaged with the first flexible snap 107 and the second hook 221 is fully engaged with the second flexible snap 108.

In an embodiment, once the second housing component 100 is coupled with the first housing component, the first flexible snap 107 may exert an outward force on the first hook 220, and the second flexible snap 108 may exert an outward force on the second hook 221. The dynamic force of the flexible snaps 107, 108 helps to further secure the second housing component 100 with the first housing component 200.

This configuration of the flexible snaps 107, 108 with the hooks 220, 221 also allow for the second housing component 100 to be removed without the need for specialized tools, so that the battery itself may be removed and replaced any number of times at any particular location or setting. Another potential advantage of this embodiment is that the flexible snaps 107, 108 may be moulded as part of the first housing component 200.

In another embodiment, alternate components commonly known in the art may be used in place of the flexible snaps 107, 108 and hooks 220, 221 for connecting the second housing component 100 with the first housing component 200. Non-limiting examples include the use of screws or clips.

FIG. 2A illustrates a top view of a first housing component 200 of the battery assembly module comprising an opening to a cavity 203 in which a battery receptacle 202 is located. The cavity 203 further comprises the first hook 220 and the second hook 221 as described in the foregoing. In an embodiment, the cavity 203 is in part surrounded by a set of channels 216, 217 formed in part by a first outer side wall 212 and a second inner side wall 213, and a third inner side wall 214 and a fourth inner side wall 215 of the first housing component 200, respectively, and described in further detail below in FIGS. 5A-5B.

The battery receptacle 202 further comprises a base 203; a first side of the base 210; a second side of the base 211; a first tab 225 and a second tab 226 located at a first end and second end of the battery receptacle 202, respectively; and a plurality of flexible arms 205.

The first tab 225 and the second tab 226 are configured to hold the ends of the battery within the battery receptacle 202 of the cavity. The tabs 225, 226 may be made from one or more flexible materials. Non-limiting examples may include materials such as polypropylene, nylon, and polycarbonate. In an exemplary embodiment, the tabs 225, 226 may be formed from the same material as the first housing component 200. Alternatively, the crush ribs 105 may be formed from a different material that the second housing component 100. If the tabs 225, 226 are made from the same material as the first housing component 200, the same mould may be used to form both. If the tabs 225, 226 and the first housing component 200 are formed from different materials, two-step moulding or other techniques commonly known to one of ordinary skill in the art may be used to form the first housing component 200 including tabs 225, 226.

Each of the tabs 225, 226 is flexible and compressible. During placement of the battery 235 into the battery receptacle 202 and once in place, the battery 235 may exert a force on the tabs 225, 226, at least partially pressing them outward, towards each end of the cavity, respectively. The tabs 225, 226 may also exert an opposing force back on the battery to help secure the battery within the battery receptacle 202.

The flexible arms 205 are shaped and configured to receive and support a battery within the battery receptacle 202 of the first housing component 200. The flexible arms 205 may be made from one or more flexible materials. Non-limiting examples may include materials such as polypropylene, nylon, and polycarbonate. In an embodiment, the flexible arms 205 may be formed from the same material as the first housing component 200. Alternatively, the flexible arms 205 may be formed from a different material than the first housing component 200. If the flexible arms 205 are made from the same material as the first housing component 200, the same mould may be used to form both. If the flexible arms 205 and the first housing component 200 are formed from different materials, two-step moulding or other techniques commonly known to one of ordinary skill in the art may be used to form the first housing component 200 including flexible arms 205.

Each flexible arm of the plurality of flexible arms extends from the base 203 of the battery receptacle 202 towards the opening of the cavity in the first housing component 200. In an embodiment, at least one flexible arm 205 extends from a first side of the base 210 and at least one extends from a second side of the base 211. In another embodiment a plurality of flexible arms 205 extend from a first side of the base 210 and a plurality of flexible arms 205 extend from a second side of the base 211. In an exemplary embodiment, at least two flexible arms 205 extend from a first side of the base 210 and at least two flexible arms 205 extend from a second side of the base 211.

In each of the embodiments comprising at least two flexible arms 205 extending from the first side of the base 210 and two flexible arms 205 extending from the second side of the base 211, the flexible arms 205 are positioned at isolated points from one another along the length of the first side of the base 210 and along the length of the second side of the base 211. In an embodiment, the distance between the flexible arms 205 along the first and second sides of the base 210, 211 may be equal. In another embodiment, the distance between the flexible arms 205 along the first and second sides of the base 210, 211 is not equal. In some embodiments, the number of flexible arms 205 extending from the first side of the base 210 may or may not be equal to the number of flexible arms 205 extending from the second side of the base 211. In some embodiments, the flexible arm(s) 205 located on the first side of the base 210 may be paired with and opposite to a flexible arm(s) 105 located on the second side of the base 211. In some embodiments, the flexible arm(s) 205 located on the first side of the base 210 are not paired in opposition with a flexible arm(s) 205 located the second side of the base 211.

The flexible arms 205 flex a relative amount to allow a battery to snap into place within the battery receptacle 202. In an embodiment, once the flexible arms 205 snap around the battery 235, a portion of the flexible arms 205 follows the circumference of the battery 235. In another embodiment, whereby the battery 235 is not cylindrical, the flexible arms 205 snap around the battery 235 and a portion of the flexible arms 205 follows or contacts at least a portion of the outer surface of the battery 235.

In an embodiment, the first housing component may further comprise a plurality of connectors 230 for mounting the assembled battery holder assembly to a device in need of the battery holder assembly 400. The battery housing assembly 400 may also be mounted to a device in need of the battery holder assembly 400 by any means commonly known in the art, including but not limited to clips, snaps, and screws.

Figure 5A:
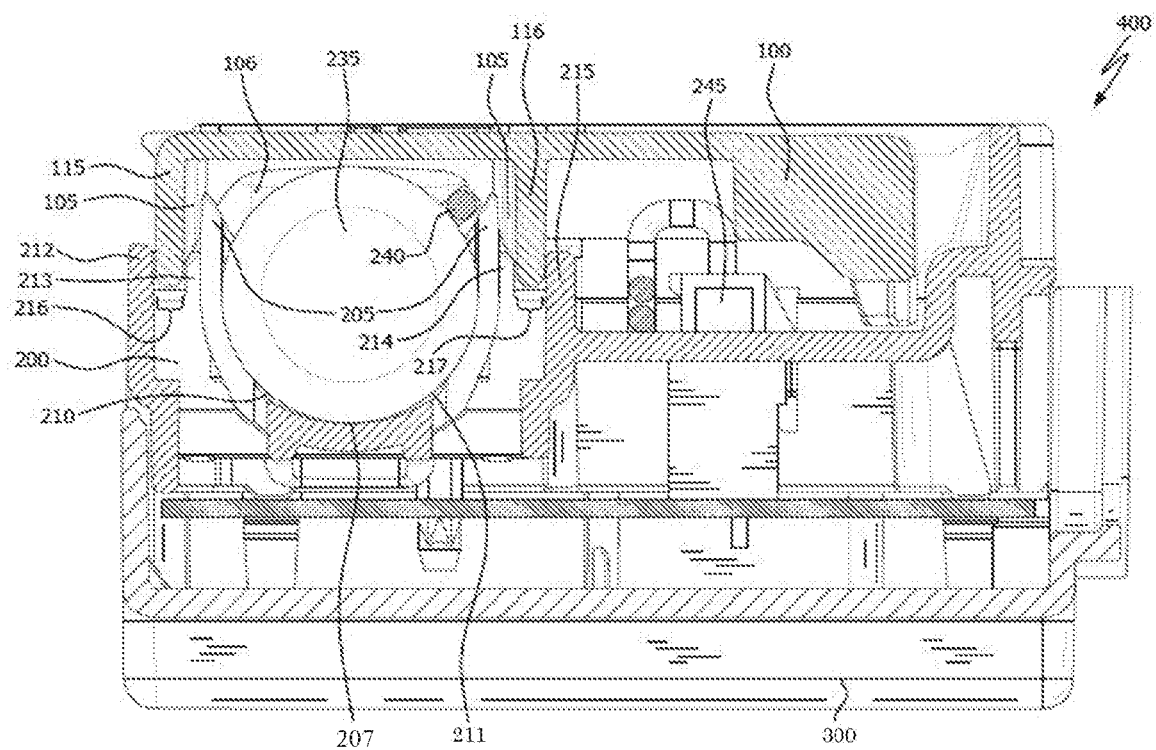
FIG. 5A is a cross-sectional view of the assembled battery holder assembly module including a battery.

FIG. 5A illustrates a cross-sectional view of the assembled battery holder assembly 400 having a battery 235 in place. Illustrated are at least the end cap 300; the first housing component 200; the base 203 and flexible arms 205 of the battery receptacle 202; and the second housing component 100 comprising the crush ribs 105.

In an embodiment, the first housing component 200 may further comprise a battery plug cavity 247, wherein a battery plug 245 is housed as illustrated in FIG. 2B. The first housing component 200 may also comprise clips 246 on its surface wherein battery cables for a charging circuit of a battery may be held.

Figure 3A:
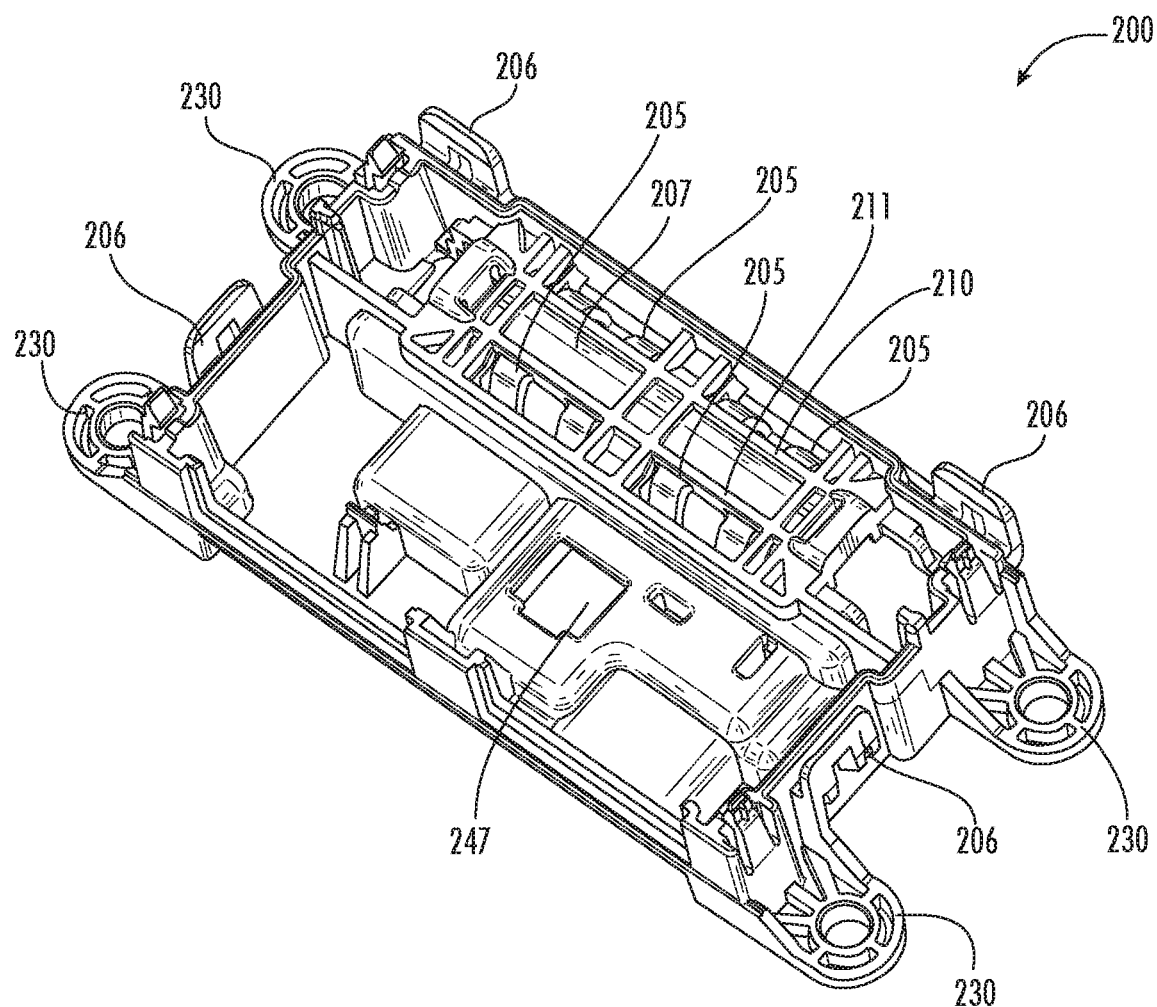
FIG. 3A is a bottom view of the first housing component of FIG. 2A, which is configured to receive an end cap.

FIG. 3A illustrates the bottom surface of the first housing component 200, wherein other components may be positioned. Non-limiting examples of these components may include, at least one of a printed circuit board, an amplifier, a microphone, or a speaker. These components can be arranged within the first housing component in any arrangement suitable for use.

Figure 3B:
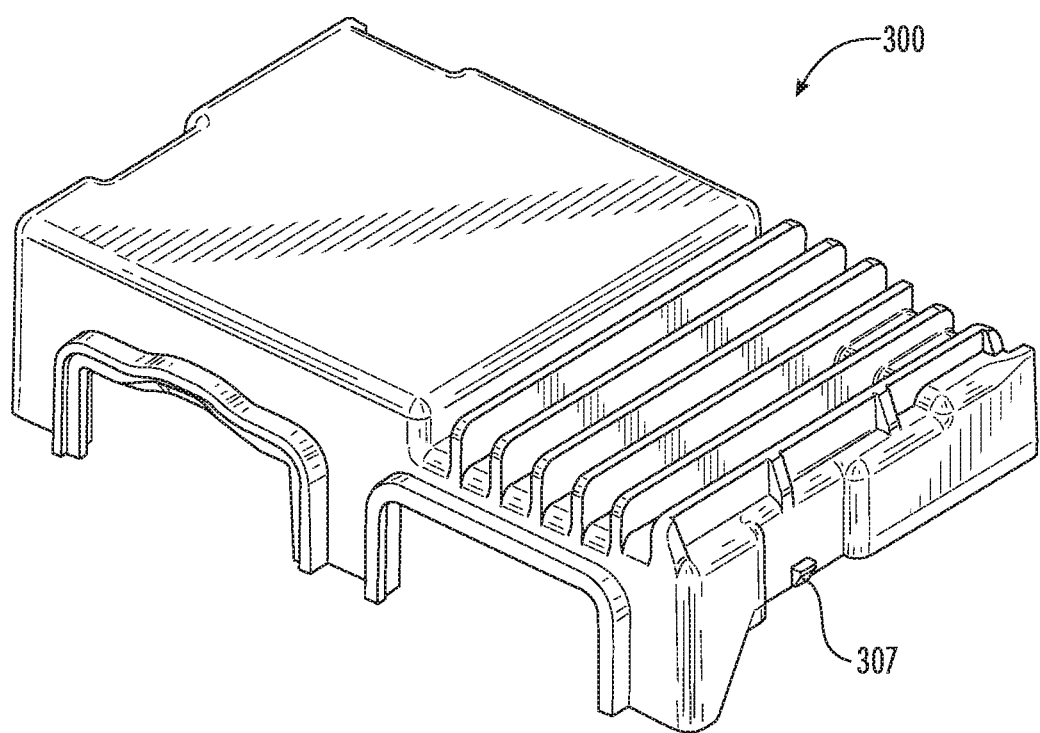
FIG. 3B is a perspective view of an outer surface of the end cap.

FIG. 3B illustrates an outer view of an end cap 300 component of the battery holder assembly 400. The end cap 300 is configured to cover at least a bottom surface of the first housing component 200. The end cap 300 may be considered as the main cover for the entire battery holder assembly module 400 and can be coupled to the first housing component 200 using any means commonly known in the art by one of ordinary skill, including receiving hooks 307, which can be coupled to side hooks 206 on the first housing component 200.

The end cap 300 may be made from one or more materials. Non-limiting examples may include materials such as plastic, aluminum, and stamped steel.

Figure 4A:
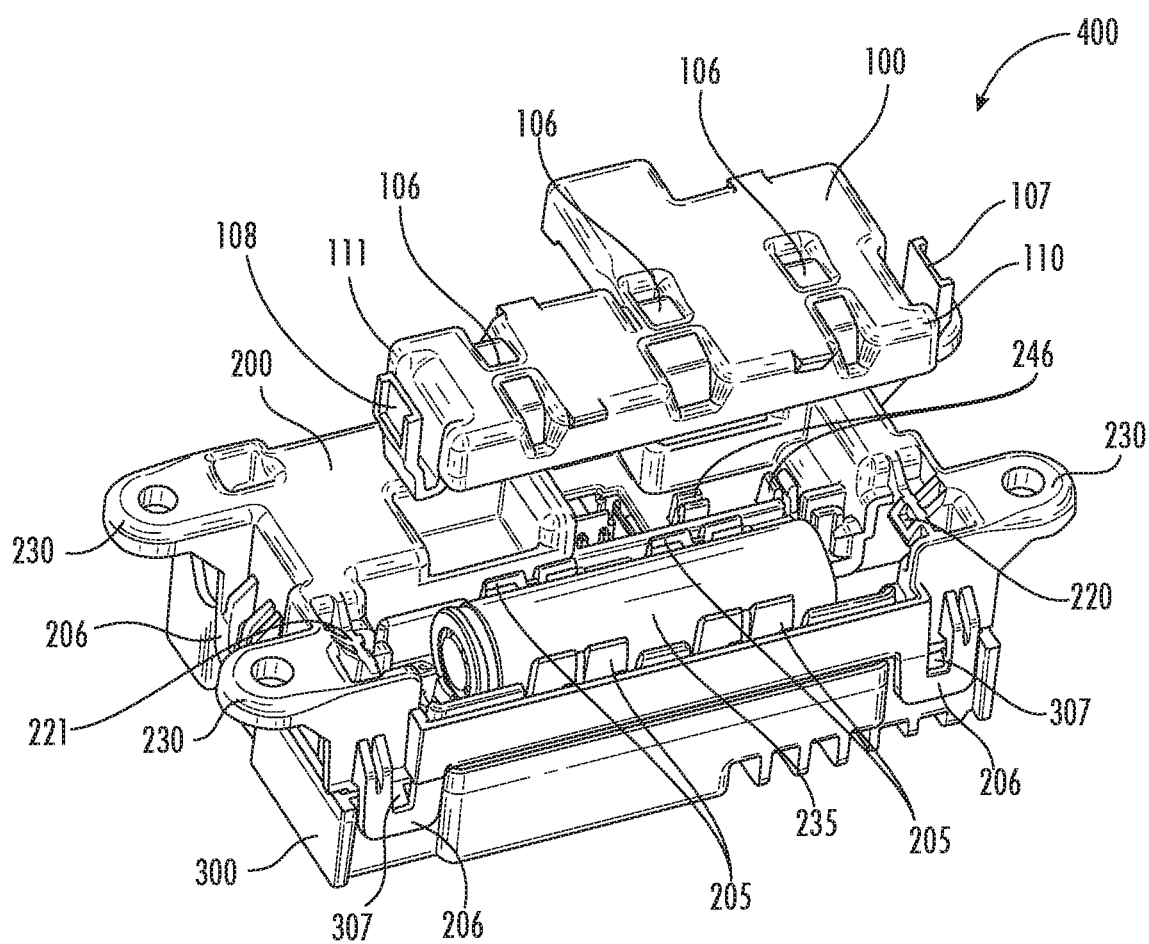
FIG. 4A is a perspective view of the battery holder assembly module comprising the first housing component, the second housing component and the end cap, and a battery not showing its cables, wherein the second housing component is not engaged with the first housing component.

FIG. 4A illustrates the battery holder assembly 400, having a battery 235 has been placed within the first housing component 200, wherein the second housing component 100 is positioned above, and not coupled to the first housing component 200. The battery 235 is positioned within the battery receptacle 202 and the flexible arms have flexed around the battery and at least a portion of the flexible arm 205 follows the circumference of the battery 235.

FIG. 4A also illustrates the second housing component 100 from its outer surface, which is positioned for alignment and coupling onto the first housing component 200. In an embodiment, the first flexible snap 107 is aligned with the first hook 220 and the second flexible snap 108 is aligned with the second hook 221. Not shown are at least the crush ribs 105 because they are located on the inner surface of the second housing component 100, but once in position, the crush ribs 105 may also contact the flexible arms 205 of the first housing component 200 to help align the first housing component 200 with the second housing component 100. In this illustration the cables from the battery 235 have not been included in order to better visualize the components of the battery holder assembly module.

Figure 4B:
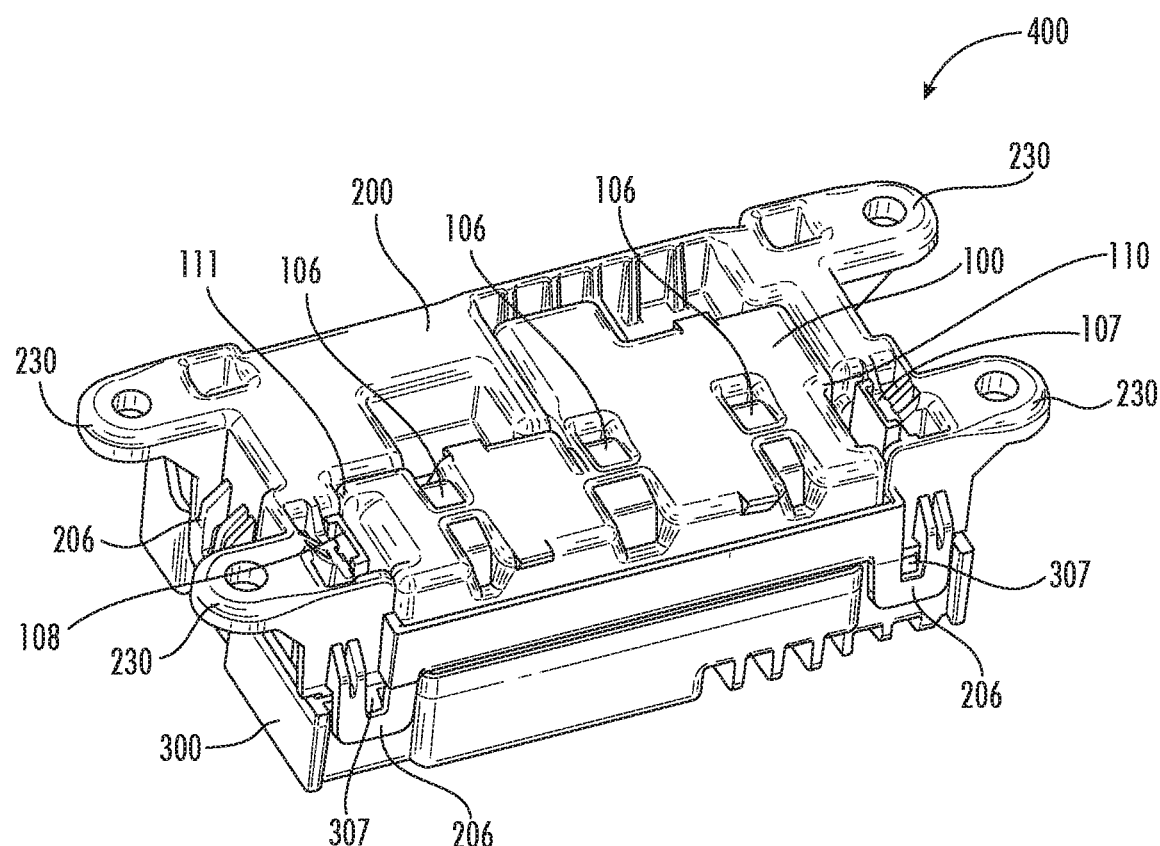
FIG. 4B is a perspective view of the assembled battery holder assembly module of FIG. 4A, wherein the second housing component is engaged with the first housing component.

The end cap 300 is positioned on the bottom surface of the first housing component 200, wherein the first housing component 200 may further comprise side hooks 206 for coupling with the end cap 300. In an exemplary embodiment, a side hook 206 is located at each corner end of the side walls of the first housing component 200 as illustrated in FIGS. 4A and 4B. In another embodiment the side hooks 206 may be located along the end walls of the first housing component 200 provided they are not in the way of the connectors' 230 ability to connect to a vehicle. In another embodiment, the side hooks 206 may be located on side walls and end walls of the first housing component 200, at or not at the corner edge. In an embodiment there could be two or more side hooks 206. In an exemplary embodiment, there are two side hooks 206 located on a side wall of the first housing component adjacent to the first side wall 212 of the cavity. The end cap 300 may be coupled to the first housing component 200 using any means commonly known in the art by one of ordinary skill, including receiving hooks 307, which can be coupled to side hooks 206 on the first housing component 200.

FIG. 4B illustrates the battery holder assembly 400, wherein the second housing component 100 is coupled with the first housing component 200. The first flexible snap 107 is engaged with the first hook 220 of the first housing component and the second flexible snap 108 is engaged with the second hook 221 of the first housing component 200. Not shown are at least the crush ribs 105 because they are located on the inner surface of the second housing component 100; however, the crush ribs 105 are engaged with the flexible arms 205 of the first housing component 200.

In an embodiment, the first sub-compartment 101 of the second housing component 100 is positioned above the cavity comprising the battery 235 and battery receptacle 202, and a second sub-compartment 102 is positioned above the clips for cables 246 and the battery plug cavity 247, wherein a battery plug 245 may be housed.

Figure 5B:
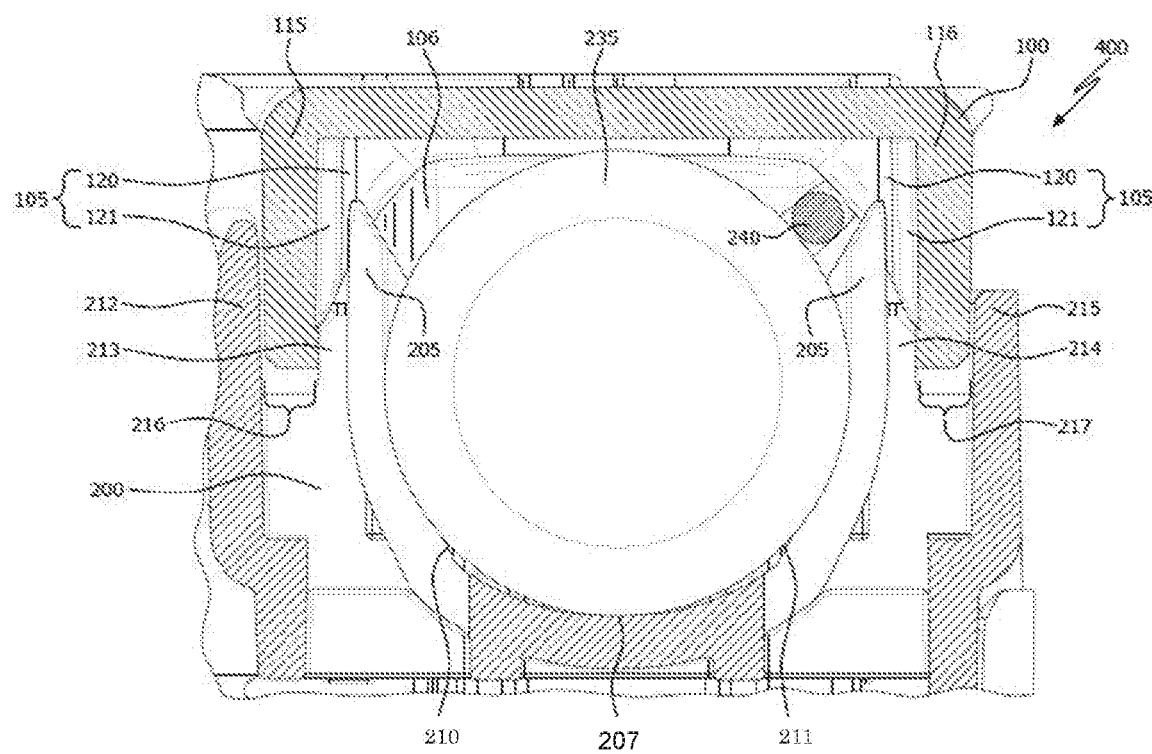
FIG. 5B is a magnified cross-sectional view of the assembled battery assembly module including a battery of FIG. 5A.
Figure 6:
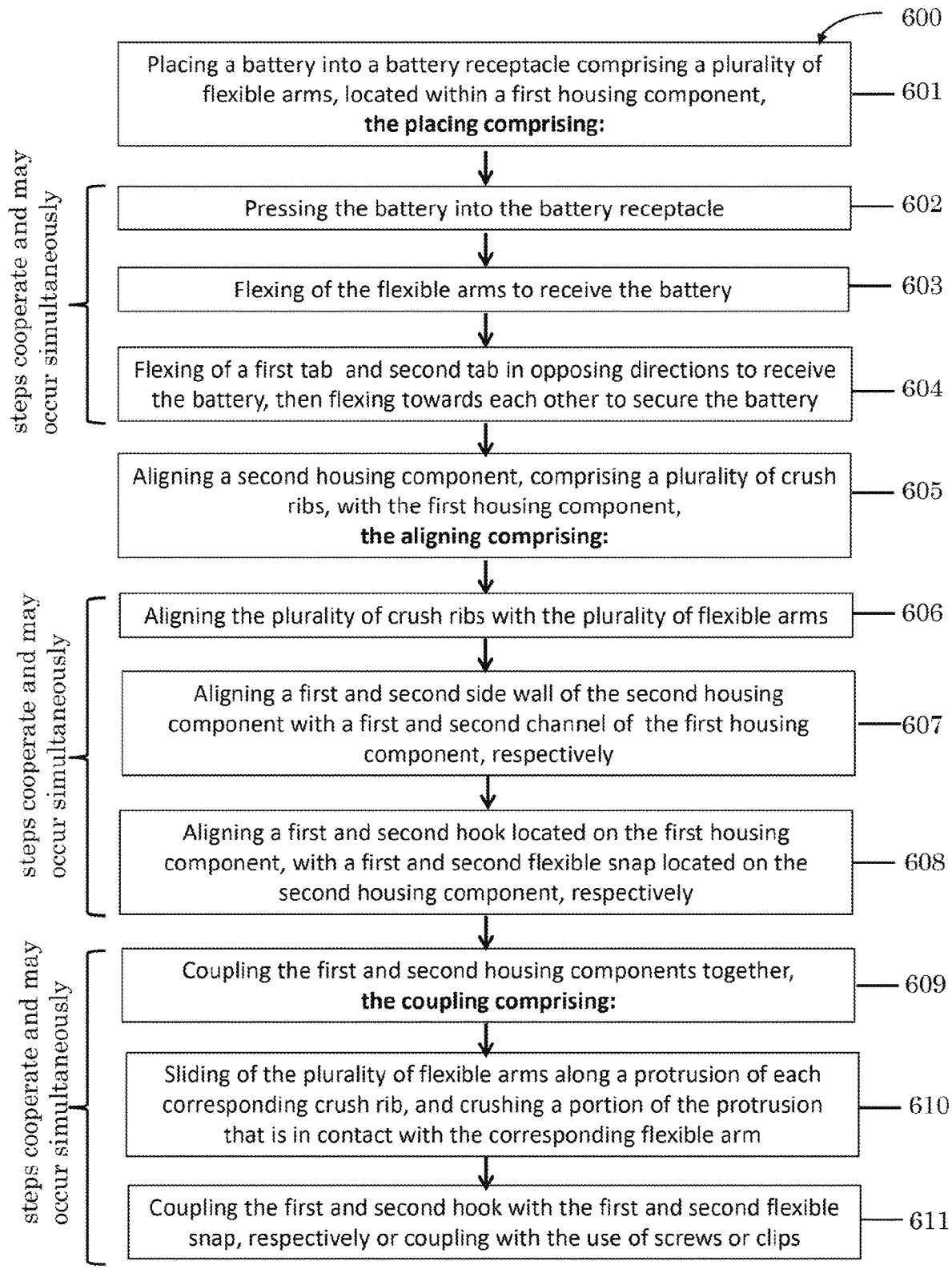
FIG. 6 is a flow chart detailing a method of securing a battery with the battery holder assembly.

FIG. 5A illustrates a cross-sectional view of the assembled battery holder assembly 400 having a battery 235 in place. Illustrated are at least the end cap 300; the first housing component 200; the base 203 and flexible arms 205 of the battery receptacle 202; and the second housing component 100 comprising the crush ribs 105. FIG. 5B is a line drawing that illustrates the same cross-sectional view of the assembled battery holder assembly 400 as in FIG. 5A in order to better illustrate certain features of the assembly.

In an embodiment, a channel follows the perimeter of the cavity 203, surrounding it. The channel may be defined at least by a first channel part 216 on one side of the cavity 203 and a second channel part 217 on a second side of the cavity 203. The channel is formed at least by an outer wall and a series of inner walls of the first housing component 200. With regard to the sides of the cavity 203, the first channel part 216 may be formed by a first outer side wall 212 and a second inner side wall 213, and the second channel part 217 may be formed by a third inner side wall 214 and a fourth inner side wall 215.

In an embodiment the first channel part 216 and the second channel part 217 can be brought into contact with the first side wall 115 and second side wall 116 of the second housing component, respectively, helping to align the first housing component 200 with the second housing component 100. In an embodiment, the first side wall 115 and the second side wall 116 of the first housing component 200 may be inserted into the first channel part 216 and the second channel part 217 of the second housing component 100, respectively, upon coupling of the first and second housing components 200, 100.

In an embodiment, the first side wall 115 of the second housing component 100 extends to the bottom of the first channel part 216 and the second side wall 116 of the second housing component 100 extends to the bottom of the second channel part 217.

In an embodiment, the battery holder assembly in its final setting is oriented such that the first housing component 200 is on top of the second housing component 100. Accordingly, the first and second channel parts 216, 217 would be on top and may act as an umbrella to prevent water or liquids from splashing into the battery receptacle and reaching the battery 235.

In an embodiment, an O-ring or sealant may be placed in the channel to provide a waterproof seal. This could be useful in either orientation, whether the first housing component 200 is on top of or under the second housing component 100.

FIG. 5B illustrates an enlarged cross-sectional view of the assembled battery holder assembly 400 having a battery 235 in place. In the embodiment depicted in this figure, the crush ribs 105 have a triangular protrusion 120. Notably, the pointed tips of the triangular protrusion of each crush rib 105 do not directly press against the battery 235.

Also illustrated in FIG. 5B is a "crushing" of a portion of the protrusion 120 of the crush ribs 105. Upon coupling of the first and second housing components 200, 100, the outward force applied by the flexible arms 205 "crushes" the portion of the protrusion 120 that is in contact with it. The crush ribs 105 can in turn exert a force back against the flexible arms 205, wherein the flexible arms 205 spread out the force being applied. This compressive interaction between the crush ribs 105 and the flexible arms 205 helps to keep a tight yet flexible connection between the second housing component 100, the first housing component 200, and the battery 235.

In an embodiment, the battery 235 may be cylindrical, as illustrated in FIGS. 2B, 4A, 4B, and 5A 5B. In an exemplary embodiment, the battery is an 18650 rechargeable battery. In the case of a rechargeable battery, a charging circuit is present in the battery holder assembly 400 so that the battery 235 is always being charged. In other embodiments, different shapes and types of batteries may be used in the battery holder assembly 400 and may include at least a battery p act.

In an embodiment, upon insertion of the battery holder assembly 400 module into a device in need of the battery holder assembly 400, the entire battery holder assembly 400 may be turned upside down so that the second housing component 100 is on the top and the first housing component 200 is on the bottom of the assembly 400. However, for the purposes of orientation and illustration, all reference points correspond with the orientations illustrated in the drawings.

In an exemplary embodiment, and illustrated in the drawings, the first housing component 200 is a housing and the second housing component 100 is a battery cover. One of ordinary skill in the art would understand that in other embodiment, the first housing component may be the battery cover and the second housing component may be the housing.

Although the features and elements are described above in particular combination, one of ordinary skill in the art will appreciate that each feature or element may be used alone or in any combination with the other features and elements.

This disclosure also represents a method 600 for securing a battery 235 within the battery holder assembly 400 disclosed in the foregoing. In some implementations, the steps can be re-arranged or omitted.

In an embodiment, a battery 235 may be placed 601 into a battery receptacle 202, which is located within the cavity 203 of a first housing component 200 of the battery holder assembly 400. Once in position, pressing 602 of the battery 235 into the battery receptacle 202 comprising the flexible arms 205 occurs. During this pressing 602, the flexible arms 205 flex 603 outward to receive the battery 235. Flexible arms 205 located along a first side of the base 210 may flex out towards a first outer side wall 212 of the cavity 203, and flexible arms 205 located along a second side of the base 211 may flex out towards a third inner side wall 214 of the cavity 203. When a sufficient amount of force is applied, the battery 235 may then be fully pressed into place within the battery receptacle 202, wherein the flexible arms 205 may follow an outer surface of the battery. Once in position, the flexible arms 205 may exert an opposing force on the battery 235, helping to secure the battery 235 within the battery receptacle 202.

In an embodiment, while the battery 235 is pressing 602 into the battery receptacle 202, the ends of the battery 235 may also contact a first tab 225 and second tab 226 of the battery receptacle 202, wherein the first tab 225 is located at a first end of the base and second tab 226 is located at a second end of the base. As pressing 602 of the battery 235 into the battery receptacle 202 continues, the respective ends of the battery 235 exert a force on the first tab 225 and second tab 226, flexing 604 the first and second tabs 225, 226 in opposing directions. This flexing of the tabs 604 may allow the battery 235 to be further pressed into position. When a sufficient amount of force is applied, the battery 235 may then be fully pressed into position within the battery receptacle 202. Once in position, the flexible tabs 225, 226 may exert an opposing force on the battery 235, helping to secure the battery 235 within the battery receptacle 202.

Each of these steps, including the pressing 602, flexing of the flexible arms 603, and flexing of the first and second tabs 604 may occur simultaneously until the battery 235 is fully positioned in the battery receptacle 202 along the base 203. Pressing 602 of the battery 235 into position occurs in each embodiment; however, in some embodiment, flexing 603 of the flexible arms 603 may occur alone or in combination with flexing 604 of the flexible tabs 225, 226.

Following placement of the battery 235 into the battery receptacle 202, a second housing component 100 is aligned with the first housing component 200. Aligning 605 of the second housing component 100 with the first housing component 200 may occur prior to or after contact between the housing components 100, 200. Aligning may comprise aligning 606 of the plurality of crush ribs 105 with the plurality of flexible arms 205; aligning 607 of a first side wall 115 and second side wall 116 of the second housing component 100 with a first channel part 216 and second channel part 217 of the first housing component 200, respectively; and aligning 608 of a first flexible snap 107 and second flexible snap 108 of the second housing component 100 with a first hook 220 and a second hook 221 of the first housing component 200, respectively.

In an embodiment, a distal tip portion of the plurality of flexible arms 205 is aligned 606 with the distal end of a corresponding crush rib 105 of the plurality of crush ribs 105. In an embodiment, the distal end of each flexible arm 205 may contact the top face of the distal end portion of a corresponding crush rib 105.

Each of these steps, including the aligning 606 of the plurality of crush ribs 105 with the plurality of flexible arms 205, the aligning of the first and second side walls 115, 116 of the second housing component 100 with the first and second channel parts 216, 217 of the first housing component 200, and the aligning 608 of the first and second hook 220, 221 with the first and second flexible snaps 107, 108, may occur simultaneously until the housing components 100, 200 are coupled. Each of these aligning steps 606, 607, and 608 may be used alone or in combination with the other aligning steps disclosed herein.

Once the housing component 100, 200 are aligned, coupling 609 between the housing components 100, 200 occurs. Coupling may comprise sliding 610 of the plurality of flexible arms along a protrusion of each corresponding crush rib; and coupling 611 of the first flexible snap 107 and second flexible snap 108 of the second housing component 100 with a first hook 220 and a second hook 221 of the first housing component 200, respectively.

In an embodiment, sliding 610 of an outer surface of the plurality of flexible arms 205 along the protrusion 120 of a corresponding crush rib 105, exerts a force on the protrusion, "crushing" the portion of the protrusion 120 that the flexible arm 205 is in contact with.

In an exemplary embodiment, the distal end of the crush rib 105 has a top face that is angled as shown in FIG. 1C. This angle is configured to allow the tip portion of the crush rib 105 to act as a lead-in, allowing it to more easily receive the flexible arm and have it slide 610 along the surface of its protrusion 120.

In an embodiment wherein each protrusion 120 of the crush ribs 105 is less "crushable," the flexible arms 205 slide 610 along the protrusion 120 of the crush ribs 105 and exert a force on the crush ribs 105; however, that force is at least directed relatively more to flexing the first and second side walls 115, 116 of the second housing component 100 away from the flexible arms 205. Conversely, in an embodiment where each protrusion 120 of the crush ribs 105 is more "crushable," the flexible arms 205 slide 610 along the protrusion 120 of the crush ribs 105 and exert a force on the crush ribs 105; however, that force is directed relatively more to "crushing" the crush ribs 105 than in the case of the crush ribs 105 that are less "crushable." The degree of flexing of the first and second side walls 115, 116 may be affected inversely by the degree of "crushing" by the crush rubs 105.

In an embodiment, as the flexible arms 205 slide 610 along the crush ribs 105, the flexible arms 205 exert a force on the protrusion 120 of the crush ribs 105, partially crushing the protrusion 120, and partially flexing the first and second side walls 115, 116 of the second housing component 100 away from the flexible arms 205. In other words, both the protrusions 120 "crush" and the first and second side walls 115, 116 of the second housing component 100 flex outward. These pressures remain as the battery is the housed in the enclosed battery holder assembly 400.

It is this interface between the crush ribs 105 and the flexible arms 205 that secure the battery 235 with the battery holder assembly 400. The interaction between the crush ribs 105 and flexible arms 205 provides an assembly 400 with an appropriate amount of flexibility that allows for compensation of variations in battery size, and that also allows for an appropriate degree of interference between the components, to ensure that the battery 235 is securally held in place.

In an embodiment, coupling of the first hook 220 and the second hook 221 of the first housing component 200 with the first flexible snap 107 and second flexible snap 108 of the second housing component 100, respectively, further couples the first housing component 200 with the second housing component 100. A first flexible snap 107 of the second housing component 100 is configured to engage a first hook 220 of the first housing component 200 and a second flexible snap 108 of the second housing component 100 is configured to engage a second hook 221 of the first housing component 200.

In an embodiment, the first hook 220 and the second hook 221 are located exteriorly to the first flexible snap 107 and the second flexible snap 108 in the assembled state. As coupling 611 proceeds, the first hook 220 exerts an inward force on the first flexible snap 107 towards a first end wall 110 of the second housing component 100, and the second hook 221 exerts an inward force on the second flexible snap 108 towards a second end wall 111 of the second housing component 100.

In another embodiment, coupling 611 may be done by any alternate method commonly known in the art for connecting two components, in place of the flexible snaps 107, 108 and hooks 220, 221 described herein. Non-limiting examples of coupling means include screws or clips.

In an embodiment, the first and second flexible snaps 220, 221 may be further pressed towards the end walls of the 110, 111 of the second housing component 100, by a user, to facilitate disengagement of the second housing component 100 from the first housing component 200. Provided that the force used to press the flexible snaps 107, 108 towards the end walls 110, 111 is great enough, the flexible snaps 107, 108 may be disengaged from their respective hooks 220, 221, and the second housing component 100 may be uncoupled from first housing component 200. This could be advantageous, for example, in a setting where the battery of the battery holder assembly module 400 discussed herein requires changing. This could be done at any time, at any location, and would not require specific tools to uncouple the second housing component 100 from the first housing component 200.

In an embodiment, an end cap 300 may be coupled to the first housing component 200, covering at least a portion of the bottom surface of the first housing component 200, opposite the opening to the battery receptacle 202. In an embodiment, coupling of the end cap 300 may comprise placing the end cap 300 over the bottom surface of the first housing component 200 when the second housing component 100 is not coupled with the first housing component 200. In another embodiment, coupling of the end cap 300 may comprise placing the end cap 300 over the bottom surface of the first housing component when the second housing component 100 is coupled with the first housing component 200. Coupling may be done using any means commonly known in the art by one of ordinary skill. A non-limiting example includes the receiving hooks 307, which are configured to be coupled with the side hooks 206 on the first housing component 200.

Although the features and steps are described above in particular combinations and order, one of ordinary skill in the art will appreciate that each feature or step may be re-arranged or omitted.

What is claimed:

1. A battery holder assembly comprising;
   a first housing component;
   a second housing component; and
   a battery receptacle, wherein
   the first housing component comprises the battery receptacle,
   the battery receptacle comprises a plurality of flexible arms configured to support a battery,
   the second housing component comprises a plurality of crush ribs located on an inner surface of a first side wall and an opposing second side wall of the second housing component, and
   each crush rib of the plurality of crush ribs comprises a protrusion that is readily deformable and projects away from the side wall to which its corresponding crush rib is attached,
   wherein upon coupling of the first housing component with the second housing component, the plurality of crush ribs are located radially outward from the plurality of flexible arms such that each crush rib contacts an outer surface of at least one flexible arm of the plurality of flexible arms.

2. The battery holder assembly of claim 1, wherein the first housing component is a housing and the second housing component is a cover.

3. The battery holder assembly of claim 1, wherein the first housing component is the cover and the second housing component is the housing.

4. The battery holder assembly of claim 1, wherein the plurality of flexible arms extend from a base of the battery receptacle, and at least one flexible arm of the plurality of flexible arms extends from a first side of the base and at least one of the flexible arms of the plurality of flexible arms extends from a second side of the base.

5. The battery holder assembly of claim 4, wherein the plurality of crush ribs extend from an inner surface of the second housing component, with at least one crush rib couplable to the at least one flexible arm extending from the first side of the base and at least one crush rib couplable to the at least one flexible arm extending from the second side of the base.

6. The battery holder assembly of claim 1, wherein the protrusion is triangular or rounded.

7. The battery holder assembly of claim 1, wherein each crush rib of the plurality of crush ribs further comprises a ribbing.

8. The battery holder assembly of claim 1, wherein the first housing component further comprises a first hook and a second hook, and the second housing component further comprises a first flexible snap and a second flexible snap, and the first flexible snap receives the first hook and the second flexible snap receives the second hook when the first housing component is coupled with the second housing component.

9. The battery holder assembly of claim 1, wherein the first housing component further comprises a first tab disposed at a first end of the base of the battery receptacle and a second tab disposed at a second end of the base of the battery receptacle, and the first tab and the second tab are configured to secure the battery in the battery receptacle.

10. The battery holder assembly of claim 1, wherein the first housing component comprises a first channel part and a second channel part, wherein
    the first channel part is formed between a first outer side wall and a second inner side wall of the first housing component,
    the second channel part is formed between a third inner side wall and a fourth inner side wall of the first housing component, and
    a first side wall of the second housing component projects into the first channel part and a second side wall of the second housing component projects into the second channel part.

11. The battery holder assembly of claim 1 further comprising an end cap configured to cover at least a portion of an outer surface of the first housing component.

12. The battery holder assembly of claim 1, wherein the second housing component further comprises at least a rib, wherein
    the rib extends across an inner top surface of the second housing component from the first side wall to the second side wall, and
    the rib protrudes from the inner surface of the second housing component in a shape that is configured to retain the battery within the battery receptacle when the second housing component is coupled to the first housing component.

13. The battery holder assembly of claim 1, wherein the first housing component further comprises a plurality of connectors to connect the battery holder assembly to a vehicle or other device.

14. The battery holder assembly of claim 1, wherein each flexible arm of the plurality of flexible arms is positioned between the protrusion of a corresponding crush rib and a battery residing in the battery receptacle such that the protrusion does not contact the battery located in the battery receptacle upon coupling of the first housing component with the second housing component.

15. A method for securing a battery within a battery holder assembly comprising a first housing component and a second housing component, the method comprising:

placing the battery into a battery receptacle of the first housing component, wherein the battery receptacle comprises a plurality of flexible arms extending from a base of the battery receptacle that flex to receive the battery, and at least a first flexible arm of the plurality of flexible arms extends from a first side of the base and at least a second flexible arm of the plurality of flexible arms extends from a second side of the base;

aligning a second housing component, with the first housing component, wherein:
  the second housing component comprises a plurality of crush ribs located on an inner surface of a first side wall and an opposing second side wall,
  each crush rib of the plurality of crush ribs comprises a protrusion that is readily deformable and projects away from the inner surface to which its corresponding crush rib is attached,
  the plurality of crush ribs are located radially outward from the plurality of flexible arms, and
  the plurality of crush ribs contact at least one flexible arm of the plurality of flexible arms; and
upon coupling of the first housing component with the second housing component, the at least one flexible arm of the plurality of flexible arms moves along the protrusion of a corresponding crush rib of the plurality of crush ribs, crushing at least a portion of the protrusion of each corresponding crush rib that is in contact with the flexible arm.

16. The method for securing a battery within the battery holder assembly of claim 15, wherein placing the battery into the battery receptacle further comprises placing the battery between a first tab located at a first end of the base of the battery receptacle and a second tab located at a second end of the base of the battery receptacle, wherein
  the first tab and the second tab flex in opposing directions to receive the battery, and flex towards each other to secure the battery in the battery receptacle.

17. The method for securing a battery within the battery holder assembly of claim 15, wherein aligning further comprises aligning:
  a first side wall of the second housing component with a first channel part formed between a first outer side wall of the first housing component and a second inner side wall of the first housing component; and
  a second side wall of the second housing component with a second channel part formed between a third inner side wall of the first housing component and a fourth inner side wall of the first housing component, wherein
  the first side wall projects into the first channel part, and
  the second side wall projects into the second channel part.

18. The method for securing a battery within the battery holder assembly of claim 15, wherein aligning further comprises aligning a first hook with a first flexible snap and a second hook with a second flexible snap, wherein the first housing component comprises the first hook and the second hook, and the second housing component comprises the first flexible snap disposed on a first end wall of the second housing component and the second flexible snap disposed on a second end wall of the second housing component.

19. The method for securing a battery within the battery holder assembly of claim 15, wherein coupling further comprises coupling the first hook with the first flexible snap and the second hook with the second flexible snap.

20. The method for securing a battery within the battery holder assembly of claim 15, wherein upon coupling:
  each flexible arm of the plurality of flexible arms is positioned between the protrusion of a corresponding crush rib and the battery residing in the battery receptacle such that the plurality of crush ribs exert an opposing force on the corresponding flexible arm of the plurality of flexible arms, wherein each flexible arm presses against the battery.

* * * * *